US009401604B2

(12) United States Patent
Lee et al.

(10) Patent No.: US 9,401,604 B2
(45) Date of Patent: Jul. 26, 2016

(54) RELAY-BASED FOOLPROOF CIRCUIT FOR OVER-VOLTAGE PROTECTION

(71) Applicant: Alpha Networks Inc., Hsinchu (TW)

(72) Inventors: Chung-Wang Lee, Hsinchu (TW); Pao-Ching Hu, Hsinchu (TW); Huai-Tung Lee, Hsinchu (TW)

(73) Assignee: ALPHA NETWORKS INC., Hsinchu (TW)

( * ) Notice: Subject to any disclaimer, the term of this patent is extended or adjusted under 35 U.S.C. 154(b) by 252 days.

(21) Appl. No.: 14/313,487

(22) Filed: Jun. 24, 2014

(65) Prior Publication Data

US 2015/0288168 A1 Oct. 8, 2015

(30) Foreign Application Priority Data

Apr. 2, 2014 (TW) .............................. 103112272 A

(51) Int. Cl.
*H02H 3/20* (2006.01)
*H02H 11/00* (2006.01)

(52) U.S. Cl.
CPC ................................ *H02H 11/007* (2013.01)

(58) Field of Classification Search
CPC ..................................................... H02H 11/007
See application file for complete search history.

(56) References Cited

U.S. PATENT DOCUMENTS

2010/0141038 A1* 6/2010 Chapel ................. H01R 25/003
307/64

\* cited by examiner

*Primary Examiner* — Thienvu Tran
*Assistant Examiner* — Tien Mai
(74) *Attorney, Agent, or Firm* — Bacon & Thomas, PLLC

(57) ABSTRACT

The present invention provides a relay-based foolproof circuit for over-voltage protection, which is electrically connected between a plug and an electric device, and includes a relay having at least one magnetic core, a coil wound around the magnetic core and two reed switches each having a reed and being normally in a closed state because of the elastic effect of its reed. The relay-based foolproof circuit is able to provide AC power of a first specification (e.g., 110 V AC power) received from the plug to the electric device. However, when AC power of a second specification (e.g., 220 V AC power) greater than the first specification flows through the coil, the coil causes the magnetic core to generate a magnetic force great enough to drive the two reed switches into an open state for stopping the AC power of the second specification from being provided to the electric device.

9 Claims, 2 Drawing Sheets

RELAY-BASED FOOLPROOF CIRCUIT FOR OVER-VOLTAGE PROTECTION

FIELD OF THE INVENTION

Figure 1:
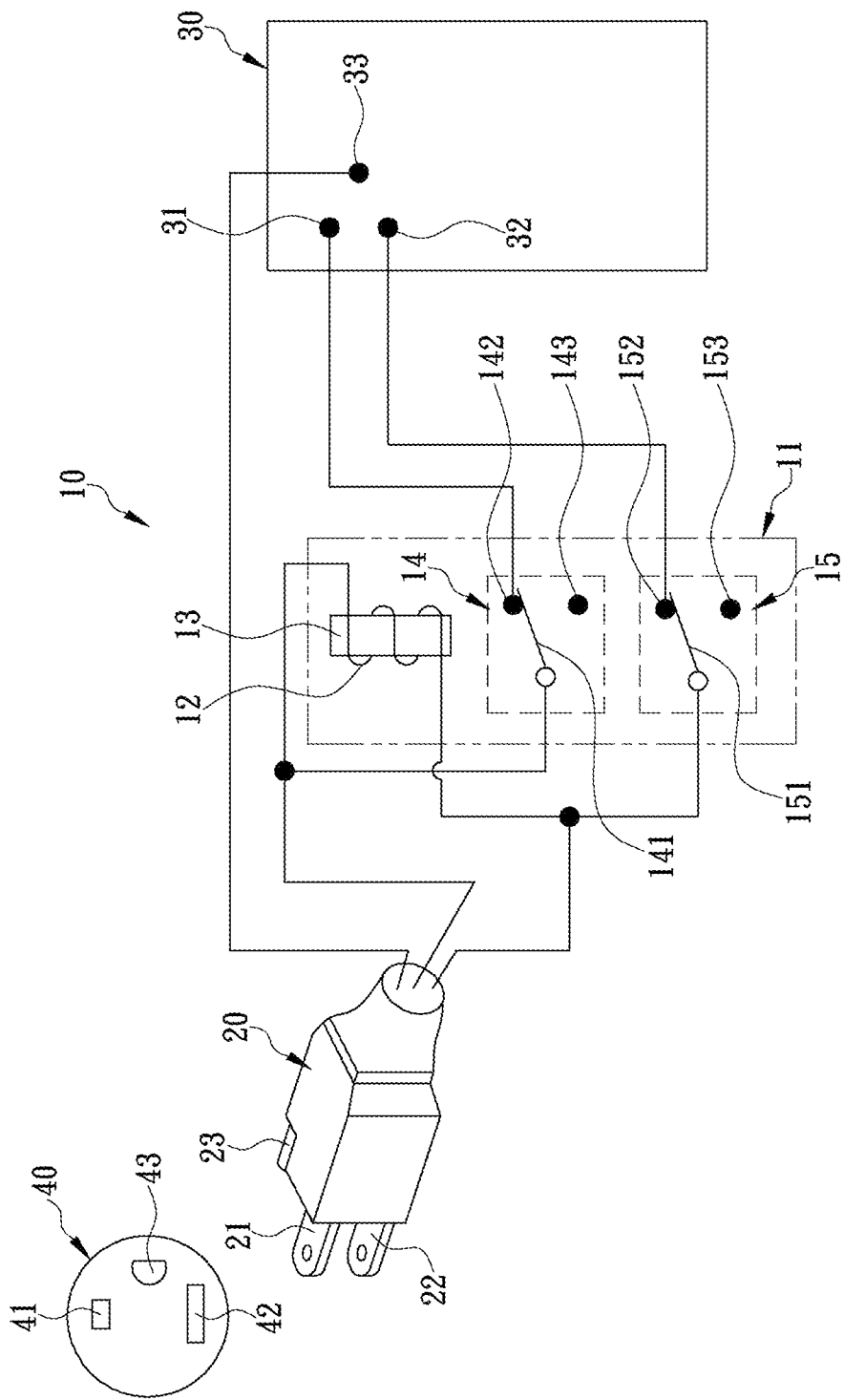

The present invention relates to a foolproof circuit, more particularly to a relay-based foolproof circuit for over-voltage protection, which is electrically connected among a plug and an electric device and includes a relay having at least one magnetic core, a coil wound around the magnetic core and two reed switches each having a reed and being normally in a closed state because of the elastic effect of its reed. The relay-based foolproof circuit is able to provide AC power of a first specification (e.g., 110 V AC power) received from the plug to the electric device. However, when AC power of a second specification (e.g., 220 V AC power) is greater than the first specification flows through the coil, the coil causes the magnetic core to generate a magnetic force great enough to drive the two reed switches into an open state for preventing the AC power of the second specification from being provided to the electric device.

BACKGROUND OF THE INVENTION

With the continuous advancement of the microelectronics technology, intelligent electric devices with microelectronic elements and different functions have emerged and are available in a wide variety, bringing great convenience to people's lives. Generally speaking, the circuits in such electric devices and the electronic elements used therein are designed according to the alternating-current (AC) voltage specification (e.g., 110 or 220 V) of predetermined countries only. In other words, the circuits and electronic elements are operable only in an environment where the corresponding AC voltage specification applies. If an electric device for use in a low-voltage environment is erroneously plugged into an AC power socket of a high-voltage specification, the high-voltage AC power not only can damage the circuits and electronic elements in the electric device, but also can cause injury or even death to the user who is troubleshooting, repairing, or performing maintenance work on the electric device, for the high-voltage AC power flowing into the electric device may leak to the user through the electric device.

The problems stated above rarely happened twenty years ago, when international travel was not as common as today. In the past two decades, however, with the rapid development of the communication, transportation, and travel industries, people have crossed country borders more frequently and at higher speed. It is very likely, therefore, that people are moving between environments of totally different AC voltage specifications without knowing it. For instance, one who is visiting different countries in a short period of time may buy an electric device in a country adopting a low-voltage specification (e.g., 110 V AC power) but does not have a chance to use the electric device until he or she arrives in a country adopting a high-voltage specification (e.g., 220 V AC power). As a result, the high-voltage AC power in the latter country may damage the circuits and components of the electric device immediately, rendering the electric device out of order. Should the user try to check or fix the electric device without knowing the real cause, the high-voltage AC power remaining in the electric device may leak to the user, causing injury if not death.

Therefore, the issue to be addressed by the present invention is to design a structurally simple, durable, and low-cost foolproof circuit which enables an electric device to function properly when plugged into a power socket of a low-voltage specification and which blocks high-voltage AC power (or direct-current (DC) power) from entering the electric device when the electric device is plugged into a power socket of a high-voltage specification. Thus, it can be ensured that the electric device is protected from damage attributable to high-voltage AC or DC power and that high-voltage AC or DC power will not leak to the user through the electric device.

BRIEF SUMMARY OF THE INVENTION

It is an objective of the present invention to provide a relay-based foolproof circuit for over-voltage protection. The relay-based foolproof circuit is electrically connected between a plug and an electric device. The plug is connected with an AC power source (e.g., wall outlet or socket) so as to receive the AC power provided by the AC power source. The electric device can be properly driven only by AC power of a first specification (e.g., 110 V AC power). The relay-based foolproof circuit includes a relay, and the relay includes a coil, at least one magnetic core, a first reed switch, and a second reed switch. Each of the reed switches has a reed and is normally in a closed state because of the elastic effect of its reed. The coil is wound around the magnetic core so that, when AC power of a second specification (e.g., 220 V AC power) flows through the coil, the coil causes the magnetic core to generate a magnetic force great enough to drive the reeds of the reed switches, thereby bringing the reed switches to an open state. The voltage value of the AC power of the second specification is greater than the voltage value of the AC power of the first specification.

Another objective of the present invention is to provide the foregoing relay-based foolproof circuit, wherein: the plug is provided with a first connection terminal and a second connection terminal, the coil has one end separately connected to the first connection terminal and the reed of the first reed switch and has the other end separately connected to the second connection terminal and the reed of the second reed switch, the first reed switch has a normally closed contact connected to a first electrode end of the electric device and has a normally open contact provided in an open-circuit state, and the second reed switch has a normally closed contact connected to a second electrode end of the electric device and has a normally open contact provided also in an open-circuit state.

Still another objective of the present invention is to provide a relay-based foolproof circuit for over-voltage protection. The relay-based foolproof circuit is electrically connected between a plug and an electric device. The plug is configured for connecting with an AC power source so as to receive the AC power provided by the AC power source. The electric device can be properly driven only by DC power of a first specification (e.g., 110 V DC power). The relay-based foolproof circuit includes a rectifier circuit and a relay. The rectifier circuit is configured for converting the AC power received by the plug into DC power. The relay is connected to the rectifier circuit so as to receive the DC power delivered from the rectifier circuit. The relay includes a coil, at least one magnetic core, a first reed switch, and a second reed switch. Each of the reed switches is normally in a closed state because of the elastic effect of its reed. The coil is wound around the magnetic core so that, when DC power of a second specification (e.g., 220 V DC power) flows through the coil, the coil causes the magnetic core to generate a magnetic force great enough to drive the reeds of the reed switches, thereby bringing the reed switches to an open state. The voltage value of the DC power of the second specification is greater than the voltage value of the DC power of the first specification.

Yet another objective of the present invention is to provide the relay-based foolproof circuit disclosed in the previous paragraph, wherein: the plug is provided with a first connection terminal and a second connection terminal, the rectifier circuit has one end separately connected to the first connection terminal and the reed of the first reed switch and has another end separately connected to the second connection terminal and the reed of the second reed switch, the coil has its two ends separately connected to the rectifier circuit so as to receive the DC power delivered from the rectifier circuit, the first reed switch has a normally closed contact connected to a first electrode end of the electric device and has a normally open contact provided in an open-circuit state, and the second reed switch has a normally closed contact connected to a second electrode end of the electric device and has a normally open contact provided also in an open-circuit state.

When the plug is connected with an AC power source supplying AC power of the first specification (e.g., 110 V AC power), the reeds of the reed switches are in contact with the corresponding normally closed contacts respectively such that the reed switches are in the closed state, in which the reed switches provide the AC power of the first specification (or the DC power of the first specification delivered from the rectifier circuit) to the electric device, enabling the electric device to work properly. When the plug is, on the other hand, connected with an AC power source supplying AC power of the second specification (e.g., 220 V AC power), the AC power of the second specification (or the DC power of the first specification delivered from the rectifier circuit) flows through the coil and causes the magnetic core to generate a magnetic force great enough to drive the reeds of the reed switches into contact with the corresponding normally open contacts respectively, thereby bringing the reed switches to the open state. The relay-based foolproof circuit of the present invention not only ensures that the electric device will not be damaged by an over-voltage, but also ensures that AC or DC power of the second specification will not leak to the user through the electric device should the plug be erroneously connected with an AC power source supplying AC power of the second specification, for both reed switches will simultaneously enter the open state upon such connection.

BRIEF DESCRIPTION OF THE SEVERAL
VIEWS OF THE DRAWINGS

Figure 2:
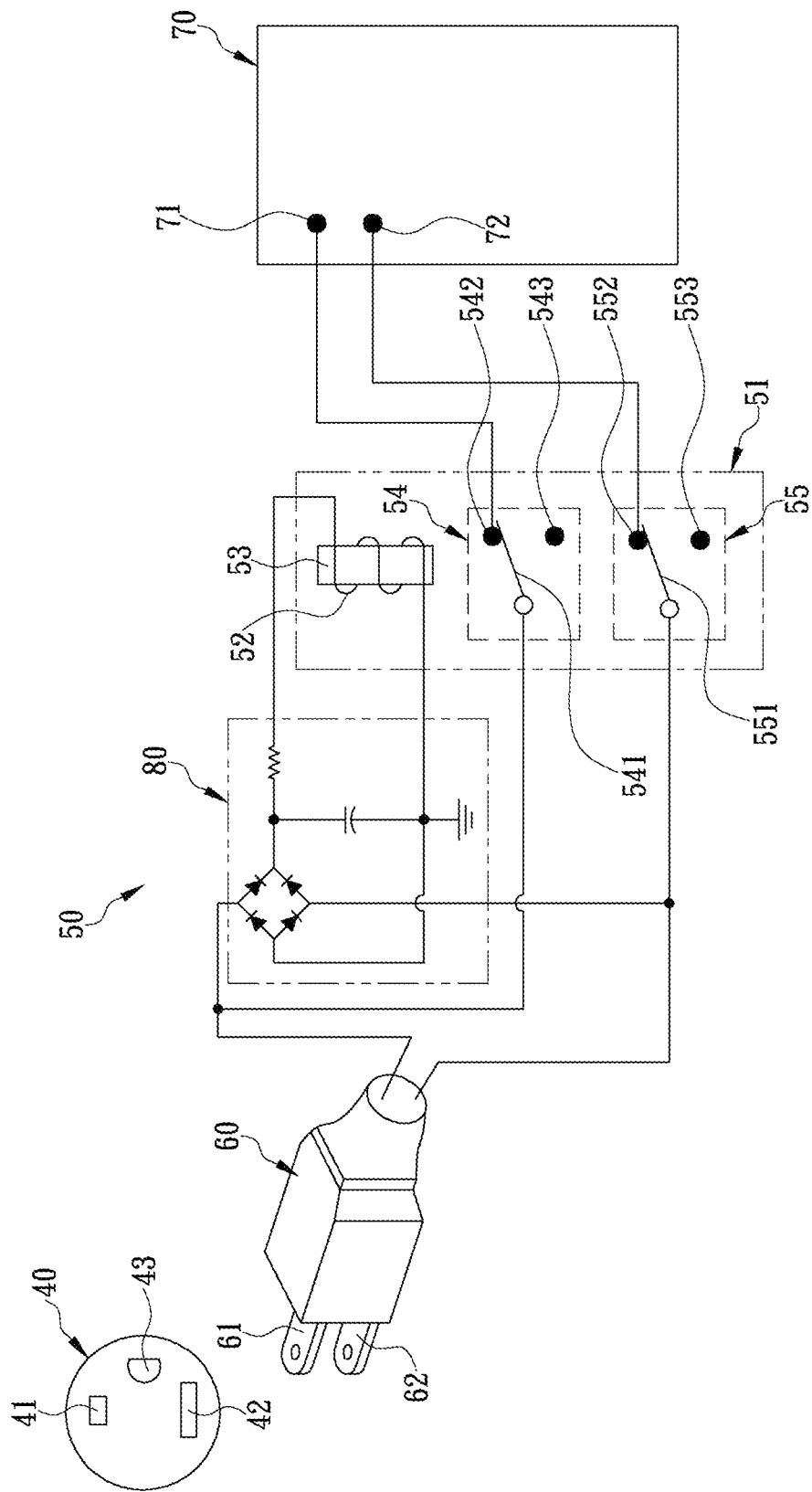

The objectives, as well as the technical features and their effects, of the present invention will be best understood by referring to the following detailed description of some illustrative embodiments in conjunction with the accompanying drawings, in which:

FIG. 1 schematically shows the layout of the relay-based foolproof circuit in the first preferred embodiment of the present invention; and FIG. 2 schematically shows the layout of the relay-based foolproof circuit in the second preferred embodiment of the present invention.

DETAILED DESCRIPTION OF THE INVENTION

The present invention discloses a relay-based foolproof circuit for over-voltage protection. Referring to FIG. 1 for the first preferred embodiment of the present invention, the relay-based foolproof circuit 10 is electrically connected between a plug 20 and an electric device 30. The plug 20 is configured for connecting with an AC power source 40 (e.g., wall outlet or source) and thereby receiving the AC power provided by the AC power source 40. The electric device 30 can be properly driven only when receiving AC power of a first specification (e.g., 110 V AC power). The relay-based foolproof circuit 10 includes a relay 11 which in turn includes a coil 12, at least one magnetic core 13, a first reed switch 14, and a second reed switch 15. Each of the reed switches 14 and 15 has a reed 141, 151. The reed switches 14 and 15 are normally in a closed state due to the elastic effect of the reeds 141 and 151. The coil 12 is wound around the magnetic core 13, and the magnetic core 13 is provided at a position corresponding to the reeds 141 and 151 of the switches 14 and 15. When AC power of a second specification (e.g., 220 V AC power) flows through the coil 12, the coil 12 causes the magnetic core 13 to generate a magnetic force great enough to drive the reeds 141 and 151 of the reed switches 14 and 15, thereby bringing the reed switches 14 and 15 to an open state. When the AC power of the second specification flows through the coil 12 no more, the reed switches 14 and 15 are driven back to the closed state by the elastic restoring forces of the reeds 141 and 151. The voltage value of the AC power of the second specification is greater than the voltage value of the AC power of the first specification. It should be pointed out that the relay-based foolproof circuit 10 of the present invention is not necessarily located outside the electric device 30; it can be located within the electric device 30 instead according practical needs, provided that the relay-based foolproof circuit 10 can cut off the electrical connection between the plug 20 and the electric device 30 when the plug 20 is wrongly connected with an AC power source 40 of the second specification, thereby preventing the over-voltage of the AC power of the second specification from damaging the electric device 30 or leaking to the user via the electric device 30.

In the first preferred embodiment as shown in FIG. 1, the plug 20 is provided with a first connection terminal 21 and a second connection terminal 22. When the plug 20 is connected with the AC power source 40, the first connection terminal 21 and the second connection terminal 22 are respectively inserted into a first electrode connection hole 41 and a second electrode connection hole 42 of the AC power source 40 and are brought into contact with a first electrode end and a second electrode end (not shown) in the electrode connection holes 41 and 42 respectively so as to receive the AC power provided by the AC power source 40. The coil 12 has one end separately connected to the first connection terminal 21 and the reed 141 of the first reed switch 14 and has the other end separately connected to the second connection terminal 22 and the reed 151 of the second reed switch 15. The first reed switch 14 has a normally closed contact 142 connected to a first electrode end 31 of the electric device 30 and has a normally open contact 143 provided in an open-circuit state. The second reed switch 15 has a normally closed contact 152 connected to a second electrode end 32 of the electric device 30 and has a normally open contact 153 provided also in an open-circuit state. When the reed switches 14 and 15 are in the closed state, the reeds 141 and 151 are in contact with the corresponding normally closed contacts 142 and 152 respectively due to the elastic effect of the reeds 141 and 151. When the reed switches 14 are 15 enter the open state, the reeds 141 and 151 are driven out of contact with the corresponding normally closed contact 142, 152 by the magnetic force generated by the magnetic core 13 and are brought into contact with the corresponding normally open contacts 143 and 153 respectively.

As shown in FIG. 1, the plug 20 is further provided with a ground connection terminal 23. When the plug 20 is connected with the AC power source 40, one end of the ground connection terminal 23 is inserted into a ground connection hole 43 of the AC power source 40 and brought into contact with a ground end (not shown) in the ground connection hole 43. The other end of the ground connection terminal 23 is electrically connected to a ground end 33 of the electric device 30.

With continued reference to FIG. 1, when the plug 20 is connected with an AC power source 40 supplying AC power of the first specification (e.g., 110 V AC power), the reeds 141 and 151 of the reed switches 14 and 15 are in contact with the corresponding normally closed contacts 142 and 152 respectively such that the reed switches 14 and 15 are in the closed state and hence provide the AC power of the first specification to the electric device 30, enabling the electric device 30 to work properly. When the plug 20 is erroneously connected with an AC power source 40 supplying AC power of the second specification (e.g., 220 V AC power), the AC power of the second specification flowing through the coil 12 causes the magnetic core 13 to generate a magnetic force great enough to drive the reeds 141 and 151 of the reed switches 14 and 15 into contact with the corresponding normally open contacts 143 and 153 respectively. As a result, the reed switches 14 and 15 enter the open state, and the AC power of the second specification is prevented from flowing into the electric device 30. The foregoing design not only ensures that the electric device 30 is safe from over-voltage damage, but also ensures that AC power of the second specification (e.g., 220 V AC power) will not leak to the user through the electric device 30 when the plug 20 is mistakenly connected with an AC power source 40 supplying such AC power, thanks to the simultaneous opening of the reed switches 14 and 15 upon the connection. Furthermore, as the relay 11 is structurally simple and durable, and the structure of the relay-based foolproof circuit 10 is simple and can be realized with ease, the objectives of the present invention—such as to protect the electric device 30 from over-voltage damage and to prevent over-voltage AC power from leaking to the user through the electric device 30—can be effectively achieved without increasing production cost significantly.

Referring to FIG. 2 for the second preferred embodiment of the present invention, the relay-based foolproof circuit 50 is electrically connected between a plug 60 and an electric device 70. The plug 60 is configured for connecting with an AC power source 40 in order to receive the AC power provided by the AC power source 40. The electric device 70 cannot be properly driven unless it receives DC power of a first specification (e.g., 110 V DC power). The relay-based foolproof circuit 50 is composed of a rectifier circuit 80 and a relay 51. The rectifier circuit 80 is configured for converting the AC power received by the plug 60 into DC power. The relay 51 is connected to the rectifier circuit 80 in order to receive the DC power delivered from the rectifier circuit 80. The relay 51 includes a coil 52, at least one magnetic core 53, a first reed switch 54, and a second reed switch 55. Each of the reed switches 54 and 55 has a reed 541, 551, and both reed switches 54 and 55 are normally in a closed state because of the elastic effect of the reeds 541 and 551. The coil 52 is wound around the magnetic core 53, which is provided at a position corresponding to the reeds 541 and 551 of the reed switches 54 and 55. When DC power of a second specification (e.g., 220 V DC power) flows through the coil 52, the coil 52 causes the magnetic core 53 to generate a magnetic force great enough to drive the reeds 541 and 551 of the reed switches 54 and 55 such that the reed switches 54 and 55 enter an open state. When the DC power of the second specification ceases to flow through the coil 52, the reed switches 54 and 55 return to the closed state due to the elastic restoring forces of the reeds 541 and 551. The voltage value of the DC power of the second specification is greater than the voltage value of the DC power of the first specification.

In the second preferred embodiment as shown in FIG. 2, the plug 60 is provided with a first connection terminal 61 and a second connection terminal 62. When the plug 60 is connected with the AC power source 40, the first connection terminal 61 and the second connection terminal 62 are inserted into a first electrode connection hole 41 and a second electrode connection hole 42 of the AC power source 40 respectively and are brought into contact with a first electrode end and a second electrode end (not shown) in the connection holes 41 and 42 respectively so as to receive the AC power provided by the AC power source 40. One end of the rectifier circuit 80 is separately connected to the first connection terminal 61 and the reed 541 of the first reed switch 54. Another end of the rectifier circuit 80 is separately connected to the second connection terminal 62 and the reed 551 of the second reed switch 55. The coil 52 has its two ends separately connected to the rectifier circuit 80 in order to receive the DC power delivered from the rectifier circuit 80. The first reed switch 54 has a normally closed contact 542 connected to a first electrode end 71 of the electric device 70 and has a normally open contact 543 provided in an open-circuit state. The second reed switch 55 has a normally closed contact 552 connected to a second electrode end 72 of the electric device 70 and has a normally open contact 553 provided also in an open-circuit state. When the reed switches 54 and 55 are in the closed state, the reeds 541 and 551 are in contact with the corresponding normally closed contacts 542 and 552 respectively as a result of the elastic effect of the reeds 541 and 551. When the reed switches 54 and 55 are in the open state, the reeds 541 and 551 are driven out of contact with the corresponding normally closed contacts 542 and 552 by the magnetic force generated by the magnetic core 53 and are brought into contact with the corresponding normally open contacts 543 and 553 respectively.

The layout of the rectifier circuit 80 in the present invention is not limited to that shown in FIG. 2, provided that the rectifier circuit 80 can convert the AC power received by the plug 60 into DC power and provide the DC power to the relay 51 when the plug 60 is connected with the AC power source 40.

With continued reference to FIG. 2, when the plug 60 is connected with an AC power source 40 supplying AC power of the first specification (e.g., 110 V AC power), the reeds 541 and 551 of the reed switches 54 and 55 are in contact with the corresponding normally closed contacts 542 and 552 respectively because of the DC power of the first specification delivered from the rectifier circuit 80. Consequently, the reed switches 54 and 55 are in the closed state and provide the DC power of the first specification to the electric device 70 in order for the electric device 70 to work properly. When the plug 60 is erroneously connected with an AC power source 40 supplying AC power of the second specification (e.g., 220 V AC power), the DC power of the second specification delivered from the rectifier circuit 80 flows through the coil 52 and causes the magnetic core 53 to generate a magnetic force great enough to drive the reeds 541 and 551 of the reed switches 54 and 55. As a result, the reeds 541 and 551 of the reed switches 54 and 55 are brought into contact with the corresponding normally open contacts 543 and 553 respectively, and the reed switches 54 and 55 enter the open state to prevent the DC power of the second specification from flowing into the electric device 70. Thus, not only is the electric device 70 kept from over-voltage damage, but also the reed switches 54 and 55, both of which enter the open state when the plug 60 is erroneously connected with an AC power source 40 supplying AC power of the second specification (e.g., 220 V AC power), ensure that the DC power of the second specification delivered from the rectifier circuit 80 will not leak to the user through the electric device 70. Moreover, the combined structure of the rectifier circuit 80 and the relay 51 is so simple, durable, and easy to carry out that over-voltage protection for the electric device 70 and the prevention of leakage of over-voltage DC power to the user through the electric device 70 can be effectively achieved without increasing production cost significantly.

While the invention herein disclosed has been described by means of specific embodiments, numerous modifications and variations could be made thereto by those skilled in the art without departing from the scope of the invention set forth in the claims.

What is claimed is:

1. A relay-based foolproof circuit for over-voltage protection, electrically connected between a plug and an electric device, wherein the plug is configured for connecting with an alternating-current (AC) power source in order to receive AC power provided by the AC power source, and the electric device can be properly driven only by AC power of a first specification, the relay-based foolproof circuit comprising a relay, the relay comprising:
    a first reed switch which, due to an elastic effect of a reed thereof, is normally in a closed state;
    a second reed switch which, due to an elastic effect of a reed thereof, is normally in a closed state;
    at least one magnetic core corresponding to the first reed switch and the second reed switch; and
    a coil wound around the magnetic core so that, when AC power of a second specification flows through the coil, the coil causes the magnetic core to generate a magnetic force great enough to drive the reeds of the reed switches, thereby bringing the reed switches to an open state, wherein the AC power of the second specification has a voltage value greater than a voltage value of the AC power of the first specification.

2. The relay-based foolproof circuit of claim 1, wherein the plug is provided with a first connection terminal and a second connection terminal, the coil has one end separately connected to the first connection terminal and the reed of the first reed switch and has an opposite end separately connected to the second connection terminal and the reed of the second reed switch, the first reed switch has a normally closed contact connected to a first electrode end of the electric device and has a normally open contact provided in an open-circuit state, and the second reed switch has a normally closed contact connected to a second electrode end of the electric device and has a normally open contact provided also in an open-circuit state.

3. The relay-based foolproof circuit of claim 2, wherein the plug is further provided with a ground connection terminal electrically connected to a ground end of the electric device.

4. The relay-based foolproof circuit of claim 3, wherein the relay-based foolproof circuit is provided in the electric device.

5. The relay-based foolproof circuit of claim 3, wherein the relay-based foolproof circuit is provided outside the electric device.

6. A relay-based foolproof circuit for over-voltage protection, electrically connected between a plug and an electric device, wherein the plug is configured for connecting with an alternating-current (AC) power source in order to receive AC power provided by the AC power source, and the electric device can be properly driven only by direct-current (DC) power of a first specification, the relay-based foolproof circuit comprising:
    a rectifier circuit for converting the AC power received by the plug into DC power;
    a relay connected to the rectifier circuit in order to receive the DC power delivered from the rectifier circuit, the relay comprising:
        a first reed switch which, due to an elastic effect of a reed thereof, is normally in a closed state;
        a second reed switch which, due to an elastic effect of a reed thereof, is normally in a closed state;
        at least one magnetic core corresponding to the first reed switch and the second reed switch; and
        a coil wound around the magnetic core so that, when DC power of a second specification flows through the coil, the coil causes the magnetic core to generate a magnetic force great enough to drive the reeds of the reed switches,
    thereby bringing the reed switches to an open state, wherein the DC power of the second specification has a voltage value greater than a voltage value of the DC power of the first specification.

7. The relay-based foolproof circuit of claim 6, wherein the plug is provided with a first connection terminal and a second connection terminal, the rectifier circuit has one end separately connected to the first connection terminal and the reed of the first reed switch and has another end separately connected to the second connection terminal and the reed of the second reed switch, the coil has two ends separately connected to the rectifier circuit in order to receive the DC power delivered from the rectifier circuit, the first reed switch has a normally closed contact connected to a first electrode end of the electric device and has a normally open contact provided in an open-circuit state, and the second reed switch has a normally closed contact connected to a second electrode end of the electric device and has a normally open contact provided also in an open-circuit state.

8. The relay-based foolproof circuit of claim 7, wherein the relay-based foolproof circuit is provided in the electric device.

9. The relay-based foolproof circuit of claim 7, wherein the relay-based foolproof circuit is provided outside the electric device.

* * * * *